(12) United States Patent
Datta et al.

(10) Patent No.: US 8,356,346 B2
(45) Date of Patent: Jan. 15, 2013

(54) VPN SECURE SESSIONS WITH DYNAMIC IP ADDRESSES

(75) Inventors: Sanchaita Datta, Salt Lake City, UT (US); Bhaskar Ragula, Salt Lake City, UT (US)

(73) Assignee: FatPipe, Inc., Salt Lake City, UT (US)

(*) Notice: Subject to any disclaimer, the term of this patent is extended or adjusted under 35 U.S.C. 154(b) by 211 days.

(21) Appl. No.: 13/016,967

(22) Filed: Jan. 29, 2011

(65) Prior Publication Data

US 2012/0030751 A1 Feb. 2, 2012

Related U.S. Application Data

(60) Provisional application No. 61/299,941, filed on Jan. 30, 2010.

(51) Int. Cl.
*G06F 15/16* (2006.01)
(52) U.S. Cl. .......................................................... 726/15
(58) Field of Classification Search .................. None
See application file for complete search history.

(56) References Cited

U.S. PATENT DOCUMENTS

| | | | |
|---|---|---|---|
| 5,657,390 A * | 8/1997 | Elgamal et al. | 713/151 |
| 6,253,247 B1 | 6/2001 | Bhaskar et al. | |
| 6,697,360 B1 * | 2/2004 | Gai et al. | 370/389 |
| 6,771,673 B1 | 8/2004 | Baum et al. | |
| 6,775,235 B2 | 8/2004 | Datta et al. | |
| 6,993,026 B1 | 1/2006 | Baum et al. | |
| 7,342,930 B2 * | 3/2008 | Ishida et al. | 370/395.54 |
| 7,406,048 B2 | 7/2008 | Datta et al. | |
| 7,444,506 B1 | 10/2008 | Datta et al. | |
| 7,594,259 B1 | 9/2009 | Audet et al. | |
| 7,725,933 B2 | 5/2010 | Fascenda | |
| 7,827,292 B2 | 11/2010 | Chen et al. | |
| 7,831,697 B2 | 11/2010 | Fukushima | |
| 7,949,785 B2 | 5/2011 | Alkhatib et al. | |
| 8,024,560 B1 | 9/2011 | Alten | |
| 2002/0069278 A1 * | 6/2002 | Forslow | 709/225 |
| 2006/0256788 A1 * | 11/2006 | Donahue | 370/389 |

* cited by examiner

*Primary Examiner* — Peter Poltorak
(74) *Attorney, Agent, or Firm* — Ogilvie Law Firm

(57) ABSTRACT

To help maintain secure and convenient connectivity for users when IP addresses change, devices connected between sites by using multiple virtual private network security associations update one another when the security association IP addresses change. The device whose WAN interface IP address changed transmits an address change notification message to the other device over a WAN interface whose IP address did not change. The message indicates which IP address(es) changed and new value(s) to use. The devices can then continue the same secure virtual private network session (from a user point of view above the security association level) by using the new value(s) for the changed IP address(es). Use of the new value for the changed IP address is transparent to (unseen by) VPN applications that are running in the LANs. IPSec sessions and load balancing may be provided.

14 Claims, 2 Drawing Sheets

VPN SECURE SESSIONS WITH DYNAMIC IP ADDRESSES

RELATED APPLICATIONS

The present application claims priority to, and incorporates by reference, U.S. provisional application No. 61/299,941 filed Jan. 30, 2010.

BACKGROUND

In computing, a virtual private network (VPN) may be used to provide remote offices or individual users with secure access to an organization's network resources. A VPN uses a public telecommunication infrastructure such as the Internet to carry data, but uses encryption, authentication, and/or other security mechanisms to help maintain privacy of the data.

SUMMARY

Maintaining secure and convenient connectivity for users when IP addresses change can be challenging. In some embodiments described herein, a first device is connected to a first LAN at a first site and a second device is connected to a second LAN at a second site. The devices establish a secure virtual private network session between the sites based on a first VPN security association and a second VPN security association. The first device has a first device first WAN interface IP address and a first device second WAN interface IP address, the second device has a second device first WAN interface IP address and a second device second WAN interface IP address. The first site has a first site LAN IP address, and the second site has a second site LAN IP address. The first VPN security association associates the first site LAN IP address and the first device first WAN interface IP address with the second site LAN IP address and the second device first WAN interface IP address. Similarly, the VPN second security association associates the first site LAN IP address and the first device second WAN interface IP address with the second site LAN IP address and the second device second WAN interface IP address.

Upon determining that at least one of the device WAN interface IP addresses has changed, the device whose WAN interface IP address(es) changed transmits an address change notification message to the other device over a WAN interface whose IP address did not change. The address change notification message indicates which IP address changed and a new value for that IP address. The devices can then continue the same secure virtual private network session (from a user point of view above the security association level) by using the new value for the IP address that changed. Use of the new value for the changed IP address is transparent to (unseen by) VPN applications that are running in the LANs.

In some embodiments, the process address change notification message indicates that multiple IP addresses have changed and indicates new values for those changed IP addresses. In some, the address change notification message is transmitted to another device, which is not currently in the secure virtual private network session. Some embodiments establish a secure virtual private network IPSec session between the sites. Some load balance between WAN interfaces of at least one of the devices.

In some embodiments, determining that a WAN interface IP address has changed involves polling WAN interfaces to detect an IP address change. In some, it involves receiving an interrupt in response to the address change.

In some embodiments, one of the devices is configured with only static WAN interface IP addresses, and address change notification messages are transmitted only from the other device, to the device that has static WAN interface IP addresses.

In some embodiments, the new value for the changed WAN interface IP address indicates that the WAN interface is no longer available, that is, the address was deleted as opposed to being replaced.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DESCRIPTION

Figure 1:
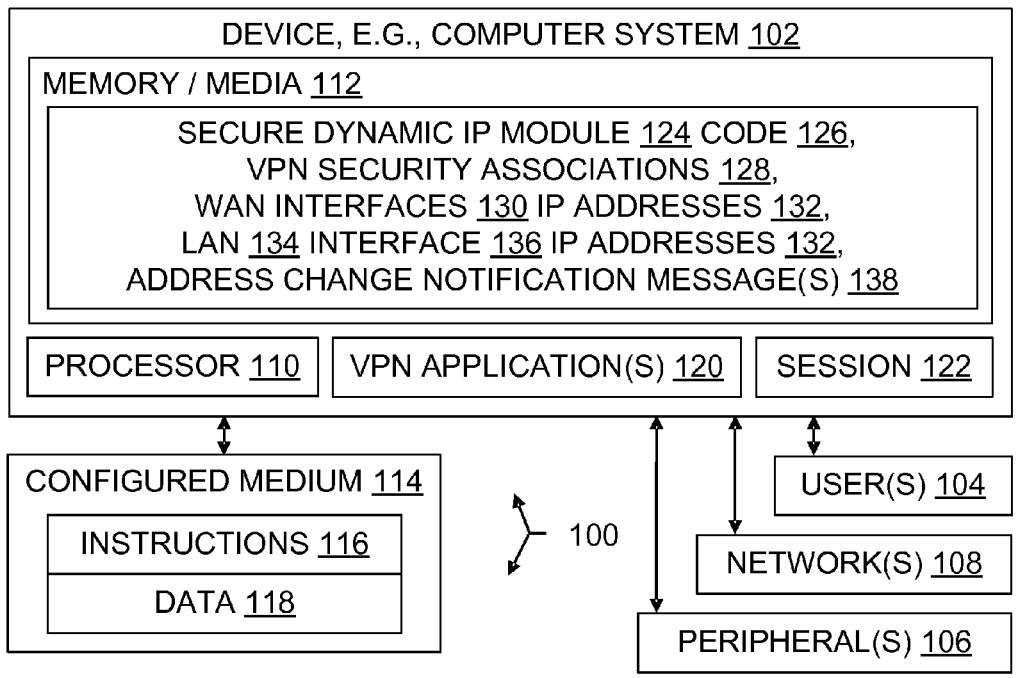
FIG. 1 is a block diagram illustrating a computer system having at least one processor, at least one memory, and other items in an operating environment which may be present on multiple network nodes, and also illustrating configured storage medium embodiments.
Figure 2:
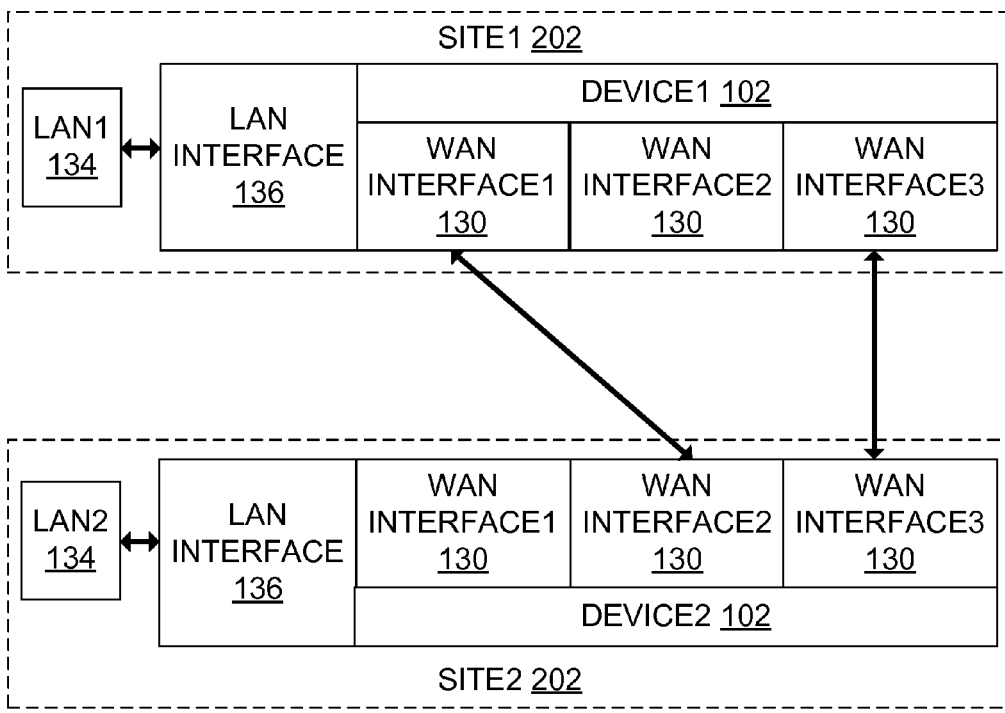
FIG. 2 is a block diagram illustrating an operational configuration of some embodiments.
Figure 3:
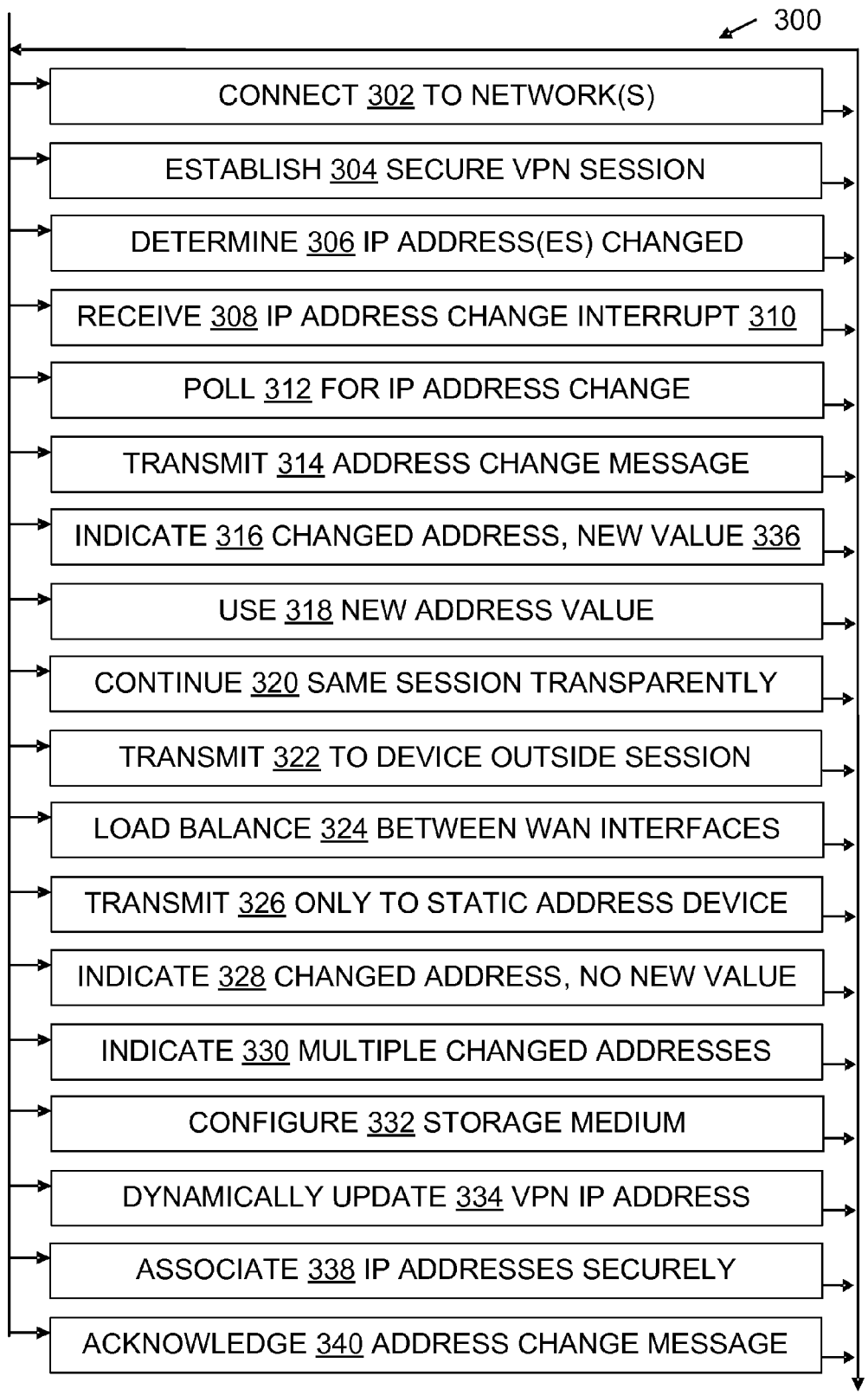
FIG. 3 is a flow chart illustrating steps of some process and configured storage medium embodiments.

Reference is made to exemplary embodiments, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, addresse(s)" means "one or more addresses" or equivalently "at least one address".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to the Figures, an operating environment 100 for an embodiment may include a computer system 102. The computer system may be a multiprocessor computer system, or not. An operating environment may include one or more machines in a given computer system, which may be clustered, client-server networked, and/or peer-to-peer networked.

Human users 104 may interact with the computer system by using displays, keyboards, and other peripherals 106. System administrators, network administrators, developers, engineers, and end-users are each a particular type of user. Automated agents acting on behalf of one or more people may also be users. Storage devices and/or networking devices may be considered peripheral equipment in some embodiments. Other computer systems may interact with the computer system or with another system embodiment using one or more connections to a network 108 via network interface equipment, for example.

The computer system includes at least one logical processor 110. The computer system also includes one or more computer-readable non-transitory storage media 112. Media may be of different physical types. The media may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor. The removable configured medium is an example of a computer-readable storage medium. Some other examples of computer-readable storage media include built-in RAM, ROM, hard disks, and other storage devices which are not readily removable by users.

The medium is configured with instructions 116 that are executable by a processor; "executable" is used in a broad sense herein to include machine code, interpretable code, and code that runs on a virtual machine, for example. The medium is also configured with data 118 which is created, modified, referenced, and/or otherwise used by execution of the instructions. The instructions and the data configure the medium in which they reside; when that memory is a functional part of a given computer system, the instructions and data also configure that computer system. In some embodiments, a portion of the data is representative of real-world items such as product characteristics, inventories, physical measurements, settings, images, readings, targets, volumes, and so forth. Such data is also transformed by as discussed herein, e.g., by connecting, establishing, securing, notifying, transmitting, execution, modification, indication, display, creation, loading, and/or other operations.

A virtual private network (VPN) application 120, data representing VPN sessions 122, browsers, other software, and other items may reside partially or entirely within one or more media, thereby configuring those media. An operating environment may also include other hardware, such as buses, power supplies, and accelerators, for instance.

Systems

In some embodiments, a secure dynamic IP module 124 includes software code 126 and hardware such as a processor 110 and memory 112. The module creates and/or utilizes VPN security associations 128 which specify wide area network (WAN) interfaces 130 by their respective IP addresses 132. The module, or another part of the device 102, communicates with a local area network (LAN) 134 through a LAN interface 136, which also has an IP address 132. When IP address(es) used by a security association change, the module prepares and transmits an address change notification message 138, as discussed in greater detail later herein.

In some embodiments peripherals 106 such as human user I/O devices (screen, keyboard, mouse, tablet, microphone, speaker, motion sensor, etc.) will be present in operable communication with one or more processors and memory. However, an embodiment may also be deeply embedded in a system, such that no human user interacts directly with the embodiment. Software processes may be users.

In some embodiments, the system includes multiple computers connected by a network. Networking interface equipment can provide access to networks, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems. Some embodiments operate in a "cloud" computing environment and/or a "cloud" storage environment.

A controller (aka box or unit) may be a system 102. However, a system may also include multiple controllers (boxes, units, device) operably connected together to facilitate secure sessions with dynamic IP addresses (changing box interface IP addresses) as discussed herein.

In some embodiments, a computer system 102 includes a logical processor 110, a non-transitory memory 112 in operable communication with the logical processor, and a module 124 residing in the memory. The module 124 has data and instructions configured to use the memory and processor to perform a process which dynamically updates an IP address which is one of multiple IP addresses being used to provide secure communication for a particular user between two sites 202 over an underlying insecure infrastructure such as the internet.

Some embodiments further include an address change notification message 138 residing in the memory. The message 138 may be provided in any digital format, but in these embodiments the message contains data indicating that multiple IP addresses 132 have changed and indicating new values 336 for those changed IP addresses.

Some embodiments further include code 126 residing in the memory which determines that a WAN interface IP address has changed by polling WAN interfaces to detect an IP address change. Some embodiments also, or alternately, include code 126 which determines that a WAN interface IP address has changed by receiving an interrupt in response to the address change.

In some embodiments, the data and instructions are also configured to use the memory and processor to transmit an address change notification message to another device which is not currently in a secure virtual private network session with the system 102 that is participating in the secure session.

In some embodiments, the data and instructions are also configured to use the memory and processor to establish a secure virtual private network IPSec session 122 between the system's site 202 and another site.

Processes

Processes may be performed in some embodiments automatically, e.g., under control of a script requiring little or no user input. Processes may also be performed in part automatically and in part manually unless otherwise indicated. In a given embodiment zero or more steps of a process may be repeated, perhaps with different parameters or data to operate on. Steps in an embodiment may also be done in a different order than the order that is laid out in text herein. Steps may be performed serially, in a partially overlapping manner, or fully in parallel. The order in which steps are performed during a process may vary from one performance of the process to another performance of the process, and from one process embodiment to another process embodiment. Steps may also be omitted, combined, renamed, regrouped, or otherwise depart from the discussed flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

In some embodiments, a first device connected to a first LAN at a first site and a second device connected to a second LAN at a second site have an established 304 secure virtual private network session 122 between the sites 202, based on a first VPN security association 128 and a second VPN security association 128. The first device has a first device first WAN interface IP address and a first device second WAN interface IP address, and the second device has a second device first WAN interface IP address and a second device second WAN interface IP address. The first site has a first site LAN IP address, and the second site has a second site LAN IP address. The first VPN security association associates 338 the first site LAN IP address and the first device first WAN interface IP address with the second site LAN IP address and the second device first WAN interface IP address. The VPN second security association associates 338 the first site LAN IP address and the first device second WAN interface IP address with the second site LAN IP address and the second device second WAN interface IP address.

In this context, or a similar context having additional security associations 128 and/or addresses 132, a communication process includes determining 306 that at least one of the device WAN interface IP addresses has changed. The device whose WAN interface IP address(es) changed transmits 314 an address change notification message to the other device over a WAN interface whose IP address did not change. The address change notification message indicates 316 which IP address changed and a new value for that IP address. Then the devices continue 320 the same secure virtual private network session using 318 the new value for the IP address that changed, with use of the new value for the changed IP address being transparent to VPN applications that are running in the LANs.

In some embodiments, the process transmits 314 an address change notification message indicating 330 that multiple IP addresses have changed and indicating new values for those changed IP addresses.

In some embodiments, the process transmits 322 the address change notification message to another device, which is not currently in the same secure virtual private network session, and possibly not in any VPN session.

In some embodiments, the process establishes 304 a secure virtual private network IPSec session between the sites.

In some embodiments, the process load balances 324 between WAN interfaces of at least one of the devices.

In some embodiments, the process determines that a WAN interface IP address has changed by polling 312 WAN interfaces to detect an IP address change. In some, the process receives 308 an interrupt 310 in response to the IP address change.

In some embodiments, one of the devices is configured with only static WAN interface IP addresses, and the process transmits 326 address change notification messages only from the other device to the device that has static WAN interface IP addresses.

In some embodiments, the new value for the changed WAN interface IP address is omitted, NUL, or otherwise 328 indicates that the WAN interface is no longer available, that is, the address was deleted as opposed to being replaced by another working address.

Configured Media

Some embodiments include a configured computer-readable storage medium. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured 332 may be in particular a removable storage medium such as a CD, DVD, or flash memory. A general-purpose memory, which may be removable or not, and may be volatile or not, can be configured 332 into an embodiment using items such as address change notification messages, or address change activity managers, in the form of data and instructions, read from a removable medium and/or another source such as a network connection, to form a configured medium. The configured medium is capable of causing a computer system to perform process steps for managing dynamic IP addresses in secure sessions as disclosed herein. Process examples thus help illustrate configured storage media embodiments and process embodiments, as well as system and process embodiments. In particular, any of the process steps taught herein may be used to help configure a storage medium to form a configured medium embodiment.

Detailed Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Address Change Activity

Consider an example of address change activity using two paths, and suitable boxes (a.k.a. controllers), such as Fat Pipe® controllers implemented in hardware and/or software consistent with the teachings herein. (FAT PIPE is mark of FatPipe Networks India Ltd.).

In a first process step, a box at site A establishes 304 a VPN secure session with a box at site B. The session is based on two virtual private network (VPN) security associations 128, using current IP addresses:

(SiteA_LAN_IPaddress, SiteA_WAN1_IPaddress_0)⇔
 (SiteB_LAN_IPaddress, SiteB_WAN1_IPaddress_0); and
(SiteA_LAN _IPaddress, SiteA_WAN2_IPaddress_0)⇔
 (SiteB_LAN _IPaddress, SiteB_WAN2_IPaddress_0).

Second, the box at site A polls 312 the SiteA_WAN1 interface and the SiteA_WAN2 interface to check for IP address changes.

Third, assume the polling detects an IP address change in the SiteA_WAN1 interface. Then the box at site A sends the box at site B an address change notification message 138 over the SiteA_WAN2 connection. The message includes the old address, SiteA_WAN1_IPaddress_0, and the new address, SiteA_WAN1_IPaddress_1.

In one embodiment, the address change notification message 138 has the following format:

```
data_type mpsec_pkt{
    serial_info;
    send_time;
    vpn_local_end_ip;
    vpn_local_natted_ip;
    vpn_local_network;
    vpn_remote_end_ip;
    vpn_remote_natted_ip;
    vpn_remote_network;
    local_port_info;
    seq;
    hash for the message authentication;
};
```

Fourth, the box at site B replies with an acknowledgment 340 of the address change.

Fifth, communication continues 320, with the boxes each using the new address instead of the old address.

Process variations are also contemplated.

As an example of variation, the boxes could have three or more connections instead of only two. If two or more connections are still in place using agreed-upon addresses (i.e., original addresses and/or addresses changed as above), then any of those agreed-upon 314, 340 address connections 302 could be used for making address changes.

As another example of variation, a single address change notification message with multiple new addresses could be sent 330 if multiple addresses change, or several individual notification messages could be sent with one address change in each message.

As another example of variation, the address change notification message could be sent immediately, or delayed until some specified criterion is met.

As another example of variation, the address change notification message 138 could be used to replace, add, or delete addresses from the set of addresses being used in a particular secure VPN session.

As another example of variation, the replaced/deleted address in the address change notification message 138 could be identified by stating it explicitly, or in some other manner such as an index into a previously provided table of addresses.

As another example of variation, the address change notification message could also be sent 322 to another box in addition to the one at the other end of the current secure VPN session, e.g., to a box that was recently in communication with the box whose address changed.

In some embodiments, the address change activity discussed above happens transparently, inside the communication between the two boxes. For instance, the VPN clients or VPN devices which request a secure session are not aware of how many WAN interfaces are used.

In some embodiments, the address change activity above relates to IPsec in that IPSec is required for some FatPipe IPVPN-based boxes. However, other variations on IPVPN may not require IPSec.

In some embodiments, the FatPipe MPSec packet/session load balancing 324 technology is required. MPSEC is a mark of FatPipe Networks India Ltd. FatPipe IPVPN-based boxes include MPSec technology.

In some embodiments, it is possible for an address change to trigger an interrupt 310 or other event which in turn leads to an address change notification message, instead of relying on polling 312 for address changes. That is, a given embodiment can wait passively for an interrupt or can poll actively, or do both.

In some embodiments, it makes no difference to the address change activity above if the session is requested by a VPN client 120 versus a VPN device.

In some embodiments, the VPN sessions 122 in the address change activity are above client-side sessions. The embodiments help ensure that the VPN sessions do not fail or re-negotiate in case of address change.

In some embodiments, the address change activity is symmetric, as in the specific example above, in that either box 102 could notify the other box of an address change. In some embodiments, only one end of the securely connected 302 sites 202 is allowed to send address change messages. For instance, one implementation requires that only remote site(s) send 326 address change message(s) whereas a central location has a static address.

In some embodiments, tunnels are part of connecting 302 to form a VPN and hence they are required.

Some embodiments include a peer-to-peer architecture with the peer(s) tracking and updating 334 dynamic IP address changes via messages 138. Some embodiments include a central server architecture (e.g., hub-and-spoke, or star topology) with the central server tracking dynamic IP address changes.

In particular, an MPsecTunnelsOverDynamicIPsDesign design discussed below provides a design which involves a central server tracking dynamic IP address changes instead of the peer-to-peer architecture assumed in the address change activity described above.

Peer Discovery in Mixed Environments

Some embodiments provides a controller which (a) is configurable as static or as dynamic, and (b) is also configurable as IPVPN or as MPVPN_plus_internal_IPsec or as MPVPN_plus_external_IPsec. In some embodiments the controller uses a remote subnet to identify IPVPN controller or MPVPN_plus_internal_IPsec controller, and uses local VPN IP address to identify MPVPN_plus_external_IPsec controller.

In some embodiments, a single central IP resolution server is used, rather than multiple LDAP servers for instance. In some embodiments, the IP resolution server proactively broadcasts updated IP address, whereas in others the IP resolution server sends updated IP address only in response to a query. Some embodiments group subnets for updates as subnet controllers register with the IP resolution server. Some use UDP, rather than ICMP.

Some provide a method of tailoring a packet controller for operation in a mixed environment, the method including the following steps using the controller user interface: selecting an address mode for the controller from a set of address modes which includes at least a static address mode and a dynamic address mode; if the static address mode is selected then selecting a role for the controller from a set of roles which includes at least an IP resolution server role and a non-server role; and if the dynamic address mode is selected then entering an IP resolution server address, which is the IP address of a different controller which is tailored to have a static address mode and an IP resolution server role.

Some methods include selecting through the controller user interface a protocol from a set of protocols which includes at least a virtual private network protocol, a multi-path routing protocol, and an IPsec protocol. Some methods include selecting through the controller user interface a protocol from a set of protocols which includes at least an IP-based virtual private network protocol, a multipath routing protocol using IPsec. Some methods include selecting through the controller user interface a protocol from a set of protocols which includes at least an IP-based virtual private network protocol, a multipath routing protocol using an IPsec-internal configuration, a multipath routing protocol using an IPsec-external configuration.

Some embodiments provide a method of peer discovery for use by an IP resolution server operating in a mixed environment, including the following steps: receiving a subnet-based peer discovery query identifying a LAN subnet; checking registered controller information for at least one controller that is associated with the LAN subnet; and responding to the subnet-based peer discovery query either with a failure code or with virtual private network and interface IP addresses of at least one controller that is associated with the LAN subnet; and also receiving a VPN-IP-based peer discovery query containing a virtual private network static IP address; checking registered controller information for at least one controller that is associated with the virtual private network static IP address; and responding to the VPN-IP-based peer discovery query either with a failure code or with an interface IP addresses of at least one controller that is associated with the virtual private network static IP address.

In some methods at least one of the responding steps also responds with a list of LAN subnet(s) that are attached to the controller. Some methods include the IP resolution server newly registering a controller by associating at least one of the following with the controller as newly registered controller information an IP address, VPN info, a LAN subnet identifier. Some methods include the IP resolution server updating at least one other controller with newly registered controller information of the newly registered controller. Some methods include the IP resolution server updating all other registered controller(s) with newly registered controller information of the newly registered controller.

In some methods the subnet-based peer discovery query identifies a querying controller which sent that query to the IP resolution server, the method includes responding to the querying controller with a failure code because no controller was associated with the LAN subnet in the registered controller information, and the method further includes associating the LAN subnet with the querying controller as a LAN subnet the querying controller queried about, and then updating the querying controller after another controller becomes associated with the LAN subnet in the registered controller information.

In some methods at least one of the peer discovery queries identifies a querying controller which sent that query to the IP resolution server, the method includes responding to the querying controller with a failure code because no controller was associated in the registered controller information with information contained in the peer discovery query, and the method further includes initializing a node in the registered controller information with LAN subnet and/or IP address information contained in the peer discovery query, adding to the node an indication that the querying controller made a query, and then updating the querying controller after another controller is registered and associated with the node in the registered controller information.

Some methods include the IP resolution server receiving another peer discovery query from another querying controller, adding to the node an indication that the other querying controller made a query, and then updating the other querying controller after another controller is registered and associated with the node in the registered controller information.

Some embodiments provide a computer-readable storage medium configured for storing data for access by a program being executed on an IP resolution server, including a network graph data structure residing in the medium, the network graph data structure including a plurality of nodes stored in the medium, each node containing controller network information for a particular controller associated with the node. The nodes include at least one subnet-based registration node identifying a registered controller by a LAN subnet in which the controller controls data packet transmission, and also containing the associated controller's interface IP address; and at least one VPN-IP-based registration node identifying a registered controller by a VPN IP address at which the controller receives data packets.

In some embodiments each node also contains a list for identifying controllers which have queried the IP resolution server to obtain an interface IP address for the node's controller, and the embodiment provides a VPN-IP-based registration, and an unregistered controller object.

MPsecTunnelsOverDynamicIPsDesign

In some past approaches, the MPsec feature is limited to boxes with static IP addresses only. When using dynamic IP addressing the MPsec configuration has to be frequently updated whenever the IP address changes. Some embodiments make a configuration change automatically without user intervention and with reduced or minimal tunnel downtime. The MPsec tunneling capability is extended between devices which don't have a static IP allocated, through automatic creation of MPsec tunnels by querying the IP addresses from a central IP resolution server.

In one implementation, a user is able to set a controller in Static or Dynamic mode. If a controller is declared as static then the user has the option of making it the Central IP resolution server. If a controller is declared as dynamic then the user enters the IP address of the Central IP resolution server.

Also, when configuring MPSEC the user specifies if the remote controller is dynamic.

On initialization or when detecting a change in one of the IP of a dynamic device, the system updates the IP information to the Central IP resolution server. When a tunnel needs to be initialized to a remote dynamic controller the IP addresses of the remote controller are obtained by querie(s) from the Central IP resolution server based on the remote destination subnet. When the Central IP resolution server is notified by the dynamic client with a particular local subnet, it will broadcast the updated IP information to all the other dynamic units that are waiting for the information of the device (aka box, controller, system) having that local subnet.

Specifically, one embodiment allows nodes in an MPSEC network to discover IP addresses of their peers, in case these IP addresses are dynamically assigned for both IPVPN and MPVPN products. The Central Resolution server will maintain the necessary information about all other peers. For each peer, in this embodiment the information includes: LAN subnets (IPVPN or MPVPN+internal IPSEC), ☐local VPN IP (MPVPN+external IPSEC), ☐WAN IP addresses, and type of configuration (IPVPN, MPVPN+internal IPSEC, MPVPN+external IPSEC). Type of configuration is a parameter for maintaining the nodes in the central server (controller) for actions like grouping and querying of the nodes. It is communicated to the server by the peers, without solicitation from the server. When a peer boots up or its configuration changes, it will send an update to the server.

With regard to querying for a Dynamic Unit, if a unit needs to establish a MPsec tunnel with its dynamic peer, it will query the central server to retrieve the information needed to initialize the tunnel establishment. This can be possible only if the unit knows static information about its peer. For IPVPN the static information will be the remote Subnet that is provided by the user through the MPsec tunnel page in graphical user interface (GUI) for each tunnel. In case of MPVPN, the static field based on which the query is made varies depending on the type of configuration—Internal IPsec or External IPsec. When using Internal IPsec, the configuration will be such that the peer's LAN subnet can be known by the ipsec configuration, and it can be used for querying the peer's information. When using External IPsec between dynamic units, the VPN devices need not have a public IP, since the IPsec tunnel can be established through the MPsec tunnel. So the VPN devices can have static private IP addresses configured as the local and remote VPN fields of the MPsec configuration. Using this remote VPN IP, the peer's information can be queried.

To support these different types of Configuration, the Central server will answer to queries based on either the LAN Subnet or the VPN IP of a dynamic peer. When a unit needs to create an MPSEC tunnel with a peer, if the peer's VPN IP and interface IP addresses are unknown, it will send a query to the central server. The query will contain either the LAN subnet or the VPN IP of the peer. The central server will look up its table based on the field the querying unit chooses. If it has the information about the peer, it will return VPN IP and interface IP addresses of the peer and all the LAN subnets attached to the peer. The querying unit will store this information in its MPSEC table and modify IPsec tunnel configuration (in case of Internal IPsec in MPVPN) if needed.

As to Maintaining Dynamic Information, measures are taken for keeping peer VPN info up-to-date on all units that might need it. In one approach, the central server will forward every update to all units. If updating all units proves undesirable, an optimization will be implemented. In order to avoid updating all units about all the peers, for each subnet, the central server will maintain a list of peers that queried about it. When information about a subnet gets updated by the node to which it is attached, the central server will send the new information to all nodes that queried for the subnet. The Central server maintains a group of peers per node, with which the MPsec tunnel needs to be established. So for each node there will be a list of peers between which the tunnel needs to established. The grouping is defined by the type of configuration between the peers. In case of IPVPN and MPVPN with Internal IPsec, the list of peers maintained is switched to use the static field—local subnet, so the node can be retrieved locally from the list of Dynamic units based on the subnet. When MPVPN with external IPsec is used, the list of peers are identified by the VPN IP address of the peers which is the static field here.

When an unregistered node is queried for, the node is initialized with the information contained in the query and the querying unit's static field is stored in the list of peers for that node. Thereafter if any new query comes in for a node, the querying node(s) are also added to the list. By doing this, the query for an unregistered dynamic unit is recorded and the dynamic IP information will be handed out to its peers when it registers later. If the node had already registered and initialized before it has been queried for, and a new query comes in, then also the querying unit's static field will be added to the list of peers, in order to update the dynamic information whenever the node is updated with newer information.

If a FatPipe having a subnet x.x.x.x (IPVPN or MPVPN with internal Ipsec) or a Local VPN IP X.X.X.X (MPVPN with external IPsec) registers itself or updates new IP information to the Central server, the Central server will broadcast this information to all the controllers that have the subnets or VPN IP address that are maintained in the group of peers for the subnet x.x.x.x or local VPN IP address x.x.x.x respectively. Whenever a unit is updated with a newer IP information of itself or its peer, the old MPsec tunnel is torn down and re-initialized with the newer information. This communication between the central server and dynamic units will be done by using UDP.

Configuration Design

In one embodiment, the nature of the unit will be configurable from the Main MPsec Page in a GUI. The unit that needs to acts as the central server will be configured as a static unit with IP resolution server option enabled on it. Further to that, the list of IPs on which it should accept queries is also configured. Each unit that has dynamic IP addresses is configured as a dynamic unit, the IPs of the IP resolution server are entered for the dynamic unit to be able to query for peer information and update its information. The unit(s) that do not have dynamic IP addresses are configured as static Units. In case it needs to establish MPsec tunnel with dynamic units, then the IPs of the IP resolution server are entered for it to be able to query for dynamic peer information.

In one embodiment, the nature of the Type of configuration and remote unit's IP addresses determines the configuration option for the MPsec Paths. Firstly, when adding a MPsec tunnel to the table, the nature of the remote peer is also configured. The fields that are to be input for the local and remote peer when the MPsec entry is added depends on the type of configuration—IPVPN and MPVPN with internal IPsec or MPVPN with external IPsec. As discussed, the querying and grouping of the Dynamic units in the list needs a static variable on the Dynamic Peer. That static variable will be what is configured when adding the MPsec tunnel. When the configuration is IPVPN or MPVPN with internal IPsec, and the remote peer is dynamic the field input will be remote subnet. In the case of MPVPN with external IPsec, with the remote peer being dynamic, the field input will remain as the remote VPN IP. If the remote peer is configured as dynamic, the remote controller IP of each path will accept the interface name, in the format of FatPipe's ethX, instead of IP addresses. So when the unit is updated with the latest IP information of the remote peer, it will replace the interface name with the updated IP and add/modify the tunnel in the MPsec table accordingly.

As to configuration on Dynamic MPVPN unit with external IPsec, specifically, configuration of Internal IPsec with MPVPN on dynamic units, when Internal IPsec is chosen to be used with MPVPN, the ipsec is configured in such a way that the change in local external IP would be updated to the ipsec configuration. So the local external IP for the VPN tunnel will be set as the wan interface rather than IP, on selecting it to be dynamic. The same change would apply to the MPsec configuration where in the local VPN IP would be set to the interface name rather than its IP. On detecting a change in the local external VPN IP, the same would be updated to the MPsec table and all IPsec tunnels reinitialized automatically. This facilitates load balancing multiple IPsec tunnels between different subnets using IPsec on that same local dynamic WAN interface.

As to implementation, one user interface protocol format conforms with the following:

| | |
|---|---|
| NAME: | SET_REMOTE_PATH_INFO |
| DATA: | int index |
| | sequence (string FatpipeIP,Int RemotePortNumber,Int VpnLineRate, ...) |
| | int TotalPaths |
| FRMT: | "%d|%d|%s,%d,...,%d|...|%d\r\n" |
| DESC: | GLOBAL-Client sends index. |
| | Server's response to SET_REMOTE_PATH_INFO. |
| | RemotePortNumber is for remote WAN interfaces. |
| | WAN1=0,WAN2=1, etc |
| | Here the VpnLineiRate has three information: |
| | first two bytes is for GRE and COMPRESS flag: |
| | 0x1 for GRE, 0x2 for COMPRESS |
| | the last two bytes is for weight |

The following may also be noted. In some embodiments, the Central controller is a single point of failure in this configuration. One could clone LDAP files to all controllers in the system and run LDAP servers on them. However, if the secure sessions with dynamic IP addresses this technology discussed herein is deployed in star topology, then a single point of failure is not unexpected. One can alternately allow a user to input a list of LDAP servers instead of one, for failover. Anyway, the MPSEC with dynamic ip decides which LDAP server to update the information, and that server will populate the same information to other servers. Ins some deployments, private ip usages leads to tunneling ipsec through UDP transport. One can also put udp tunnel information into LDAP consideration. Steps would be taken to make LDAP servers secure and stable if new port numbers are opened to the public internet.

In some embodiments, there is one static controller and one or more dynamic ones. The static one maintains info about all the dynamic controllers' IPs and subnets. When a dynamic controller comes up or one of its IPs or subnets changes, it notifies the static controller (e.g., central server or static peer), which updates its tables. In some embodiments this static controller broadcasts updates to all dynamic controllers whenever it receives notification about a change, while in other embodiments it only maintains this info locally and dynamic controller query for this info when needed.

Some embodiments use Internet Control Message Protocol (ICMP). In some, a user need not know whether the mpsec is dynamic or static. If one configures the mpsec remote ip with device name in the same time, then one needs is a message for update and query such as "get/set, vpn_dest_ip, vpn_dest_subnet, deviceIndex, deviceIp, priority, nat_port (for tunnel ipsec through udp)". This approach will work with both ipvpn and mpvpn. The message is binary c struct type so one need not parse the data.

However, another approach is to use udp for topology change instead of icmp to facilitate upgrades difficulties arising from incompatible problems after a change in the icmp status message type. One may add remote_device_index for vpn_dest_fatpipe structure. The possibility for a user to choose device name is not mandatory. In case they leave everything as default such as "wan1", it will not impair mpsec but for dynamic mpsec it will not work. There is little or no extra user effort needed for this feature besides select a device name from dropdown list, for star topology. One could let a user change the default topology message interval, e.g., from 1 minute to 5 seconds, but on an interface ip changing event, the message should be sent out immediately or promptly to the elected root node in the mpsec table. In case some node is down at that time, the periodic message should update that node later. The node which receives the message does not need to broadcast that message to other node. However, every node could periodically query the information using, e.g., a message "get, vpn_dest_ip, vpn_dest_subnet, deviceIndex, deviceIp, priority" to sync the database. Another way to reduce the periodic update is introduce the update count for each vpn_out_record. In case of mpsec status change, one resets that count to 0. A dynamic node only broadcasts the message to the root node (e.g., central server) if update count is less than a certain a limit (e.g., 10).

For a fully meshed architecture, one elects a root node, e.g., using a spanning tree method. So every other node talks to that node only. To implement some quick solution, one could introduce the priority number for local vpn information page. Then based on static assigned priority scan every remote controller and pick the highest priority node as root node.

The topology manager can be implemented in user space as a separate process. A first reason to do this is that user space knows first that the interface changed. A second reason is to avoid an extra mechanism to notify xtremed from fatpipe.ko. For fatpipe.ko, one merely implements ioctl to set the new node information in case of change. For query or update from other nodes, xtremed could read and write that directly from shared memory. One can use current xtremed's timer to implement update message and query message to update other nodes and sync its own database. On an interface changing event, the other process sends a signal to topology manager process so it could broadcast its topology change to other nodes.

Dynamic MPSec Feature

In some embodiments, a Dynamic MPSec feature enables FatPipe MPVPN devices to work with any IP address scheme. The previous version MPSec feature only works with public static IP address schemes. The new FatPipe Dynamic MPSec feature works with static, Dynamic, DHCP (Dynamic Host Configuration Protocol), wireless mobile IP, and almost any combination of static or dynamic connections.

Some advantages of FatPipe Dynamic MPSec in some embodiments include:
  Simple setup—There is no special configuration requirement for fast deployment.
  Fast converge time—The MPVPN device is able to find the new address of dynamic connection and change the MPSec dynamically within 2 seconds. All TCP sessions will be retained because most TCP sessions timeout after 6 seconds.
  Flexibility—Works with all static and dynamic Internet connections.
  Secure—MPSec uses secure channel to encrypt and authenticate the information.
  Reliable—Dynamic MPSec will monitor all connection paths and will balance load over the lines for greater throughput.
  Increased Speed—Dynamic MPSec balances load over two or more lines for greater throughput.
  Reliable—Dynamic MPSec monitors all connection paths. It intelligently detects any data line, Internet service or component failures, and automatically reroutes information to available lines, providing the highest level of redundancy and reliability.

FatPipe Dynamic MPSec for Dynamic IPs

The introduction of ADSL technology has enabled the usage of low cost high bandwidth links with dynamically assigned IPs. High bandwidth links normally require static IPs. But ADSL, cable, mobile wireless and satellite links with dynamic IPs are now available at low cost. This makes deploying VPN technology challenging. FatPipe Networks now introduces support for dynamic IP addresses for MPVPN with enhancements to its Patented MPSec technology, which allows clients to easily and seamlessly deploy FatPipe solutions.

This new and innovative approach to MPSec technology, called Dynamic MPSEC, allows you to use dynamically allocated IPs as MPSec Path End-Points without worrying about IPs changing regularly. Dynamic MPSec technology automates the process of updating the peers whenever there is a change in IPs. With this feature, customers can design and implement VPNs over links with dynamically changing IPs without changing the configuration every time. The Dynamic MPSec configuration supports fully meshed or one-to-one settings. The VPN devices in the LAN behind the FatPipe MPVPN are configured with fixed IP address. Now the MPSec settings can be configured to be static or dynamic IP addresses on the WAN links using Dynamic MPSec. It keeps track of the IP addresses of the WAN links of all locations and dynamically changes the MPSec configuration as and when the remote IP addresses change.

For the initial configuration, the FatPipe appliances are configured with the IP address assigned at the time of configuration. Once the appliances are configured properly, any subsequent changes to the dynamic WAN IP addresses will be updated dynamically.

Consider the topic of Configuring Dynamic MPSec: using the dynamic allocation of IP address. To configure The WAN interface of the Peer site (Site A) in a remote network, login into the peer site. Click on the "Interface" tab in the main menu and click "WAN1", "WAN2", or "WAN3" tab. If your WAN IP settings are assigned dynamically by a DHCP server, you can select "Obtain an IP address automatically using DHCP." If you connect to your ISP using PPPoE, you can select "Connect using PPPoE." To assign IP Address, Subnet Mask, and Default Gateway settings to each WAN interface select "Specify an IP Address". Note: The Line Status will read UP when the WAN connection is functioning and available for data communication. Line Status will read DOWN when the WAN connection is unavailable.

Consider the topic of how to Enable Route Testing. This option should be checked if you have a public Internet line connected to the WAN port. Uncheck this option only if you are connecting a private line from which the Internet is not accessible. See Chapter 4 in the MPVPN manual under "Route Test" for more information.

On the topic of Link Speed/Duplex Mode, this option allows you to manually configure Ethernet link speed and the duplex mode.

On the topic of Load Balancing Weight, this setting is for use with the Weighted Load balancing algorithm. Values configured here will be assigned as the Weight for that WAN interface.

On the topic of Services, FatPipe provides a secure system with most services disabled except those needed to provide Remote Management, SSH, DNS, SNMP. Although these services present minimal risk, you can enable or disable these features as desired. You can also block Ping (ICMP ECHO) requests for the WAN interface IP. These options do not affect traffic routed through MPVPN.

On the topic of Spillover Priority Level, Spillover Load balancing allows you to assign different priorities to WAN connections to prevent line saturation.

Traffic is sent over the lines with the highest priorities, set by you. Only when these lines come close to being saturated—which is calculated as 90 percent of the lines' nominal throughput—will the device start sending traffic over the connections with next lower priority. This feature provides a solution for users that are charged for their lines proportionally to the traffic they generate. You will normally want to use this feature as a backup at the times your network is carrying a high load. By assigning lower priority to such a line, you will achieve optimal usage and minimize the cost.

On the topic of Route Test, You can select the way for performing the route test. It is set to Always by default unless you choose the on primary failure option.

On the topic of Link Bandwidth, this setting is for use with Quality of Service (QoS). You should specify the maximum bandwidth available outbound for your WAN line in Kbps (Kilobits per second). For example, if you have 1.5 Mbps of bandwidth outbound, you would enter 1500.

On the topic of a Link Stabilizing Factor, this is the number of consecutive Route Test failures or successes that must occur before Line Status is changed. If the Line Status is UP, the status will change to DOWN only after this number of consecutive Route Test failures. If the Line Status is DOWN, the status will change to UP only after this number of consecutive Route Test successes. See Chapter 4 in the MPVPN manual under Route Test for more information.

Now consider the topic of Configuring the local site (site B) MPSec. To configure the local site MPSec, login in to the local site. Click on the "Routing" tab from the main menu and click on the "MPSec" tab On the topic of FatPipe MPSec, Local VPN Name is user-defined and can be any descriptive name. Local VPN IP Address is the IP address of the local VPN device. Select the remote site name to which the local MPVPN will connect.

Polling Interval specifies how often the FatPipe MPVPN unit (an example of a box, controller, device, system discussed herein) checks the connections of all the entries in the table. The default is 15 seconds, which is reasonable as long as your lines are stable. If your lines are not stable, and tend to go up and down periodically, then you'll want to set this polling interval to a smaller value, such as 3 seconds.

Remote VPN Name is user-defined and can be any descriptive name. Remote VPN IP Address is the IP address of the remote VPN device. Remote FatPipe IP is the IP address of a remote MPVPN WAN IP address to which the local MPVPN will connect. The load balancing can be either session or packet load balancing. To add an MPSec entry, click on the Add button.

On the topic of how to Add Remote VPN Entry, Enter the Remote Location information, such as Remote VPN Name, Remote VPN IP, and Load Balancing Option and Load Balancing Type. Click on the OK button to return to the MPSec page. Once done, click on the SAVE button to make the changes permanent. Select the particular site name from the Select Site Name dropdown box to configure the path for the particular remote location and click on the Configure button.

On the topic of how to Configure MPSec Paths, You will need to specify which of the local WAN lines you want to use to send VPN packets. If you have two active WAN lines, you will typically select WAN1 and WAN2. If you have three active WAN lines, you will typically select WAN1, WAN2, and WAN3. When selecting "None" from the dropdown box the changes made to the WAN IP of the peer site will not be updated.

Select the particular site name from the dropdown box Select Site Name to view the current status of the particular MPSec paths for any existing remote site and click Status. Select "All Sites" from the dropdown box Select Site Name to view the current status of the MPSec paths for all existing remote sites and click Status. The status of each port will read ON, OFF, or (−). ON indicates the connection is established. OFF indicates the connection is not established. The symbol (−) indicates the connection is not enabled.

Conclusion

Although particular embodiments are expressly illustrated and described herein as processes, as configured media, or as systems, it will be appreciated that discussion of one type of embodiment also generally extends to other embodiment types. For instance, the descriptions of processes also help describe configured media, and help describe the operation of systems and manufactures like those discussed in connection with other examples. It does not follow that limitations from one embodiment are necessarily read into another. In particular, processes are not necessarily limited to the data structures and arrangements presented while discussing systems or manufactures such as configured memories.

Some information presented herein is derived from marketing materials. Implementation details and functionality descriptions may pertain to specific code, such as specific APIs and specific sample programs, and thus need not appear in every embodiment. Features described have not necessarily been implemented in prototype circuitry, prototype code, or more commercial versions. Program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Specific features of an example may be omitted, renamed, grouped differently, repeated, instantiated in hardware and/or software differently, or be a mix of features appearing in two or more of the examples. Functionality shown at one location may also be provided at a different location in some embodiments.

Any apparent inconsistencies in phrasing associated with a given item should be understood as simply broadening the scope of what is referenced. Lack of a drawing reference number in text herein discussing a step or an item does not necessarily mean that the step or item in question is different than the illustrated steps/items.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A communication process comprising the steps of:
a first device connected to a first LAN at a first site and a second device connected to a second LAN at a second site establishing a secure virtual private network session between the sites based on a first VPN security association and a second VPN security association,
the first device having a first device first WAN interface IP address and a first device second WAN interface IP address, the second device having a second device first WAN interface IP address and a second device second WAN interface IP address,
the first site having a first site LAN IP address, the second site having a second site LAN IP address,
the first VPN security association associating the first site LAN IP address and the first device first WAN interface IP address with the second site LAN IP address and the second device first WAN interface IP address,
the VPN second security association associating the first site LAN IP address and the first device second WAN interface IP address with the second site LAN IP address and the second device second WAN interface IP address,
determining that at least one of the device WAN interface IP addresses has changed;
the device whose WAN interface IP address(es) changed transmitting an address change notification message to the other device over a WAN interface whose IP address did not change, the address change notification message indicating which IP address changed and a new value for that IP address;
the devices continuing the same secure virtual private network session using the new value for the IP address that changed, with use of the new value for the changed IP address being transparent to VPN applications that are running in the LANs.

2. The process of claim 1, wherein the process transmits an address change notification message indicating that multiple IP addresses have changed and indicating new values for those changed IP addresses.

3. The process of claim 1, wherein the process further comprises transmitting the address change notification message to another device, which is not currently in the secure virtual private network session.

4. The process of claim 1, wherein the process comprises establishing a secure virtual private network IPSec session between the sites.

5. The process of claim 1, wherein the process comprises load balancing between WAN interfaces of at least one of the devices.

6. The process of claim 1, wherein determining that a WAN interface IP address has changed comprises polling WAN interfaces to detect an IP address change.

7. The process of claim 1, wherein determining that a WAN interface IP address has changed comprises receiving an interrupt in response to the address change.

8. The process of claim 1, wherein one of the devices is configured with only static WAN interface IP addresses, and the process transmits address change notification messages only from the other device to the device that has static WAN interface IP addresses.

9. The process of claim 1, wherein the new value for the changed WAN interface IP address indicates that the WAN interface is no longer available, that is, the address was deleted as opposed to being replaced.

10. A computer-readable non-transitory storage medium configured with data and with instructions that when executed by at least one processor causes the at least one processor to perform a process comprising the steps of:
a first device connected to a first LAN at a first site establishing a secure virtual private network session with a second device connected to a second LAN at a second site, the session based on a first VPN security association and a second VPN security association,
the first device having a first device first WAN interface IP address and a first device second WAN interface IP address, the second device having a second device first WAN interface IP address and a second device second WAN interface IP address,
the first site having a first site LAN IP address, the second site having a second site LAN IP address,
the first VPN security association associating the first site LAN IP address and the first device first WAN interface IP address with the second site LAN IP address and the second device first WAN interface IP address,
the VPN second security association associating the first site LAN IP address and the first device second WAN interface IP address with the second site LAN IP address and the second device second WAN interface IP address,
the first device determining that at least one of the first device's WAN interface IP addresses has changed;
the first device transmitting an address change notification message to the second device over a WAN interface whose IP address did not change, the address change notification message indicating which IP address changed and a new value for that IP address; and
the first device continuing the secure virtual private network session using the new value for the IP address that changed.

11. The configured medium of claim 10, wherein during the process the first device transmits an address change notification message indicating that multiple IP addresses have changed and indicating new values for those changed IP addresses.

12. The configured medium of claim 10, wherein the process further comprises transmitting the address change notification message to another device, which is not currently in the secure virtual private network session.

13. The configured medium of claim 10, wherein the process comprises the first device participating in establishing a secure virtual private network IPSec session between the sites.

14. The configured medium of claim 10, wherein determining that a WAN interface IP address has changed comprises at least one of the following: polling WAN interfaces to detect an IP address change, receiving an interrupt in response to the address change.

* * * * *